United States Patent [19]

Goedtke et al.

[11] Patent Number: 4,473,517

[45] Date of Patent: Sep. 25, 1984

[54] METHOD OF PRODUCING AN EXPANDED INSULATING LAYER FOR PROPELLANT CHARGES

[75] Inventors: Peter Goedtke, Munich; Heinz G. Langer, Gauting, both of Fed. Rep. of Germany

[73] Assignee: Messerschmitt-Bolköw -Blohm GmbH, Fed. Rep. of Germany

[21] Appl. No.: 455,488

[22] Filed: Jan. 4, 1983

[30] Foreign Application Priority Data

Jan. 21, 1982 [DE] Fed. Rep. of Germany ....... 3201746

[51] Int. Cl.$^3$ ............................................ B29C 27/10
[52] U.S. Cl. ..................................... 264/46.5; 156/79; 156/322; 156/334
[58] Field of Search ................ 264/3 R, 46.5; 156/79, 156/322, 334, 294

[56] References Cited

U.S. PATENT DOCUMENTS

| | | | |
|---|---|---|---|
| 3,056,171 | 10/1962 | Fite | 18/59 |
| 3,308,210 | 3/1967 | Ross | 264/3 |
| 3,489,714 | 1/1970 | Sayles | 260/41 |
| 3,578,520 | 5/1971 | Dolan et al. | 156/79 |
| 3,990,369 | 11/1976 | Sayles | 102/103 |
| 4,337,218 | 6/1982 | Byrd et al. | 264/3 R |

*Primary Examiner*—Robert A. Dawson
*Attorney, Agent, or Firm*—McGlew and Tuttle

[57] ABSTRACT

An insulating layer is effected between a propellant charge in the interior walls of a combustion chamber of a rocket engine by applying an expandable plastic to the inside of the combustion chamber housing between the housing and the outer circumferential wall of the propellant charge then expanding the plastic. Advantageously the combustion chamber is preheated before introducing the charge and the expandable plastic into the combustion chamber. Preferably the ratio of the layer of the thickness of the expandable plastic to the spacing between the propellant charge and the walls of the combustion chamber ranges from 1 to 1½; 1 to 1 and 1 to 3. The expandable plastic is advantageously a polybutadiene.

6 Claims, No Drawings

METHOD OF PRODUCING AN EXPANDED INSULATING LAYER FOR PROPELLANT CHARGES

FIELD AND BACKGROUND OF THE INVENTION

This invention relates in general to rocket engines and in particular to a new and useful method for forming an insulating layer between a propellant charge and the walls of the combustion chamber of the rocket engine which comprises applying an expandable plastic to the inside of the combustion chamber housing between the housing and the circumference of the propellant charge and then expanding the plastic.

A method relating to propellant charge insulation preparation is discosed in German patent application No. P 31 05 932.5. In this prior art method, the expandable material is introduced by pressure into an annular space between the propellant charge and the combustion chamber housing, and allowed to cure or set. To obtain a maximum diameter of the propellant charge, and thus a correspondingly large operating range of the missile, it is sought to minimize the thickness of the insulating layer, for example to a thickness of less than 3 mm. Such a narrow annular gap, however, can be filled only to a certain extent if this prior art method is applied. Further, a high pressure must be provided, which makes the produced foamed plastic non-homogeneous.

SUMMARY OF THE INVENTION

The present invention is directed to a method of producing an insulating layer of a homogeneous expanded material in a very narrow annular gap, of any small dimention (for example less than 3 mm).

Accordingly, it is an object of the invention to provide an improved method of producing an insulating layer between the propellant charge and the interior wall of a combustion chamber of a rocket engine which comprises placing an expandable plastic inside the combustion chamber between the propellant charge and the combustion chamber and expanding the plastic.

A further object of the invention is to provide an improved method of producing an insulating layer within a rocket engine combustion chamber which comprises sintering a propellant charge within the combustion chamber and heating the area to expand the plastic.

A further object of the invention is to provide a method of applying an insulation in the combustion chamber of a rocket engine which is simple to effect and easy to carry out and does not provide an detriments to storage.

DESCRIPTION OF THE PREFERRED EMBODIMENTS

The expandable plastic to be used in the inventive method is preferably polybutadiene. That is, surprisingly, it has been found that polybutadiene adheres and is bonded very strongly to the steel surface of the combustion chamber wall. Further, expanded polybutadiene withstands high shearing forces, is highly extensible, and remains flexible over a wide temperature range, down to $-60°$ C.

Between a layer of expanded plastic and the propellant charge, another layer may be provided in addition, consisting of a hygrous alkali silicate layer with an epoxy resin tissue, which has a thickness of less than 1 mm, for example 0.1 mm, and can expand during the combustion of the propellant charge. Such an alkali silicate layer is described in German patent application No. P 31 33 787.2 Aside from polybutadiene, polyurethane and silicone foams may also be employed with the inventive method.

The expansion is preferably effected by preheating the wall of the combustion chamber. Instead, however, an expandable material may be used requiring a certain time for the expansion to start, so that upon inserting the propellant charge carrying the expandable material into the combustion chamber housing, the foam forming reaction starts automatically. What is important is to introduce the propellant charge into the combustion chamber housing in exactly a centrical position so as to obtain a uniformly thick indulating layer around the propellant charge.

The provided ratio of a thickness of the applied expandable material to the width of the annular gap ranges from 1 to 5, to 1 to 3, thus with a 3 mm wide annular gap, should be around 1 mm, for example.

The insulating layer to be produced in accordance with the invention is suitable particularly for propellant charges of the front burning type.

The layer of expandable plastic may be applied to the propellant charge, for example, by means of an annular wiper centrally surrounding and along the propellant charge.

The following example is intended to explain the invention in more detail:

EXAMPLE

An expandable material is prepared as follows:
100 gram of polybutadiene with terminal hydroxyl groups; average molecular weight about 2,800; viscosity at 30° C. 5.0 pascal; density at 30° C. 0.901;
7–9 of hexamethylene diisocyanate (linking agent, hardener);
0.1 to 0.5 g of iron acetyl acetonate (accelerator);
0.5 to 1.0 g of phenyl-beta-naphtylamine (antiaging agent);
0.5 to 1.5 g of commercial silicone-based pore size controller;
5–10 g of powdery silicic acid (thickener);
are mixed with each other and the mixture is further mixed with
20–40 g of a foaming agent comprising a mixture of equal amounts by weight of trichloro-trifluorethane and tetrafluorodichlorethane.

The combustion chamber housing is heated up to 80° to 120° C. The propellant charge, with the expandable material thus prepared applied thereon in a 1 mm thick layer, is introduced into the thus preheated combustion chamber housing which causes the material to expand. A fine-pore foam is formed having a density of about 0.2 to 0.6 gram per $cm^3$.

Instead of a mixture of trichloro-trifluorethane and tetrafluorodichlorethane, powdery agents such as ammonium carbonate, bicarbonate, carbamate, oxalate and tartrate, as well as mixtures of these ammonium salts may be used. These salts are introduced finely ground with a particle size of less than 60 microns.

What is claimed is:
1. A method of producing an insulating layer between a propellant charge and the inside walls of a combustion chamber housing of a rocket engine, comprising defining a space between the propellant charge and the inside wall of the combustion chamber, applying an expandable plastic made of a foaming agent and polybutadiene into the space, and expanding the plastic.

2. A method according to claim 1, including heating up the combustion chamber housing prior to introducing the plastic to the combustion chamber.

3. A method according to claim 1, including heating the plastic in order to expand it.

4. A method according to claim 1, including heating the housing of the combustion chamber and positioning the propellant charge centrally within the combustion chamber housing.

5. A method according to claim 1, wherein the propellant charge is placed in a combustion chamber before it is heated.

6. A method according to claim 1, wherein the ratio of the layer thickness of the expandable plastic to the spacing between said propellant charge and said combustion chamber housing wall ranges from 1 to 1½; to 1 to 3.

* * * * *